United States Patent
Ljung et al.

(10) Patent No.: US 11,039,303 B2
(45) Date of Patent: Jun. 15, 2021

(54) FLEXIBLE INDICATION OF CAPABILITY COMBINATIONS SUPPORTED BY A WIRELESS COMMUNICATION DEVICE

(71) Applicant: Sony Mobile Communications Inc., Tokyo (JP)

(72) Inventors: Rickard Ljung, Helsingborg (SE); Basuki Priyanto, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/317,554

(22) PCT Filed: Jul. 15, 2016

(86) PCT No.: PCT/EP2016/066953
§ 371 (c)(1),
(2) Date: Jan. 13, 2019

(87) PCT Pub. No.: WO2018/010819
PCT Pub. Date: Jan. 18, 2018

(65) Prior Publication Data
US 2019/0230497 A1    Jul. 25, 2019

(51) Int. Cl.
*H04W 76/10* (2018.01)
*H04W 88/04* (2009.01)
(Continued)

(52) U.S. Cl.
CPC .............. *H04W 8/24* (2013.01); *H04W 8/22* (2013.01); *H04W 60/00* (2013.01); *H04W 76/10* (2018.02);
(Continued)

(58) Field of Classification Search
CPC ......... H04W 8/24; H04W 8/22; H04W 92/10; H04W 88/08; H04W 88/04;
(Continued)

(56) References Cited

U.S. PATENT DOCUMENTS

2014/0064156 A1*  3/2014  Paladugu .......... H04W 36/0022
                                                370/259
2014/0141782 A1*  5/2014  Rantala ............. H04W 36/0066
                                                455/436
(Continued)

FOREIGN PATENT DOCUMENTS

CN    104067553 A    9/2014
CN    105450663 A    3/2016
(Continued)

OTHER PUBLICATIONS

Notice of Office Action for corresponding Application No. 2019-501538, dated Nov. 5, 2019, 3 pages, (with English Translation).
(Continued)

*Primary Examiner* — Mohamed A Kamara
(74) *Attorney, Agent, or Firm* — Tucker Ellis LLP (57) ABSTRACT

A wireless communication device (100) provides a first indication to the wireless communication network. The first indication indicates a set of at least two capabilities of the wireless communication device (100). Further, the wireless communication device (100) determines whether the wireless communication device (100) supports a combination of two or more of the capabilities and provides a second indication to the wireless communication network. The second indication indicates whether the combination of capabilities is supported by the wireless communication device (100).

17 Claims, 7 Drawing Sheets

(51) Int. Cl.
*H04W 8/24* (2009.01)
*H04W 8/22* (2009.01)
*H04W 60/00* (2009.01)
*H04W 80/02* (2009.01)
*H04W 88/08* (2009.01)
*H04W 92/10* (2009.01)
*H04W 88/06* (2009.01)

(52) U.S. Cl.
CPC ........... *H04W 80/02* (2013.01); *H04W 88/04* (2013.01); *H04W 88/08* (2013.01); *H04W 92/10* (2013.01); *H04W 88/06* (2013.01)

(58) Field of Classification Search
CPC ... H04W 88/023; H04W 80/02; H04W 60/00; H04W 76/10; H04W 88/06
See application file for complete search history.

(56) References Cited

U.S. PATENT DOCUMENTS

| | | | | |
|---|---|---|---|---|
| 2014/0162642 | A1* | 6/2014 | Kwon | H04L 41/0853 455/435.1 |
| 2014/0204848 | A1* | 7/2014 | Geirhofer | H04W 8/24 370/329 |
| 2017/0048839 | A1* | 2/2017 | Henttonen | H04L 5/0091 |
| 2017/0367073 | A1* | 12/2017 | Murugan | H04B 1/0053 |
| 2018/0076872 | A1* | 3/2018 | Li | H04W 72/0413 |

FOREIGN PATENT DOCUMENTS

| | | |
|---|---|---|
| GB | 2514365 A | 11/2014 |
| JP | 20140534745 A | 12/2014 |
| JP | 20150523790 A | 8/2015 |
| WO | 20130063793 A1 | 5/2013 |
| WO | 20130181483 A2 | 12/2013 |
| WO | 2014112848 A1 | 7/2014 |
| WO | 2015142278 A1 | 9/2015 |
| WO | 2015180779 A1 | 12/2015 |
| WO | 2016068759 A1 | 5/2016 |

OTHER PUBLICATIONS

International Search Report and Written Opinion from counterpart International Patent Application No. PCT/EP2016/066953 dated Mar. 20, 2017, 13 pages.

3GPP "Motivation for WI proposal on Multi-profile UE capability for LTE", by Qualcomm, RP-160270, 3GPP RAN meeting #71, Gothenburg, Sweden, Mar. 7-10, 2016; 6 pages.

* cited by examiner

FLEXIBLE INDICATION OF CAPABILITY COMBINATIONS SUPPORTED BY A WIRELESS COMMUNICATION DEVICE

FIELD OF THE INVENTION

The present invention relates to methods of controlling transmissions in a wireless communication network and to corresponding devices.

BACKGROUND OF THE INVENTION

In wireless communication networks, such as a cellular network based on the LTE (Long Term Evolution) radio access technology specified by 3GPP ($3^{rd}$ Generation Partnership Project), wireless communication devices (also referred to as user equipment or "UE") can have many different capabilities (e.g., associated with modem properties). In order to make the wireless communication network aware of the capabilities supported by a certain UE, the UE indicates its capabilities to the wireless communication network, which is typically accomplished when the UE registers with the wireless communication network. The capabilities can be indicated in different formats, e.g., in terms of parameters or indicators listed in one or more information elements of a message.

In general, the UE may indicate multiple different capabilities, which may for example concern the support of different modulation and demodulation formats, maximum data demodulation rate, 3GPP release version, frequency band support, or specific functions such as relaying or the support of device-to-device communication. However, for some capabilities, combined utilization may be difficult to implement or not possible under certain operational conditions. For example, if a UE is being used as a relaying station for a connection to another UE, there may be baseband operations that could be difficult to combine. This may as one example have the effect that capabilities which can be supported on a direct-link from the wireless communication network to the UE depend on whether a side-link to one or more other UEs are active, which in turn may result in rather frequent changes of the capabilities which can actually be supported on the direct-link.

In the existing technology, the UE capabilities are however indicated in a rather static manner to the network, which means that there are only limited possibilities of handling frequent changes of supported capabilities. For example, the capabilities may be indicated upon initial network registration and in some handover scenarios, in response to the network sending a UE capability enquiry. For initiating an update of the capability information from the UE side, the UE may need to re-register in the network.

In 3GPP contribution "Motivation for WI proposal on Multi-profile UE capability for LTE" by Qualcomm, RP-160270, 3GPP RAN meeting #71, Gothenburg, Sweden, 7-10 Mar. 2016, it is proposed to configure multiple capability profiles for a UE, where each profile defines a set of multiple supported capabilities. The UE may then use RRC (Radio Resource Control) signalling to suggest a profile to an eNB (evolved Node B), and the eNB may select a profile and use RRC signalling to indicate the selected profile to the UE. However, this approach may lack sufficient flexibility, e.g., to address scenarios where the support of certain combinations varies depending on further conditions, such as a currently utilized link configuration of the UE.

Accordingly, there is a need for techniques that allow for efficiently indicating supported capabilities of a UE or similar wireless communication device to the wireless communication network.

SUMMARY OF THE INVENTION

According to an embodiment, a method is provided. According to the method, a wireless communication device provides a first indication to a wireless communication network. The first indication indicates a set of at least two capabilities of the wireless communication device. Further, the wireless communication device determines whether the wireless communication device supports a combination of two or more of the capabilities and provides a second indication to the wireless communication network. The second indication indicates whether the combination of capabilities is supported by the wireless communication device. In this way, it can be efficiently taken into account that under certain conditions simultaneous support of certain capabilities may be difficult or impossible to implement, even if each capability alone is supported.

According to an embodiment, the wireless communication device may determine that support of the combination of capabilities by the wireless communication device has changed and send a third indication to the wireless communication network. The third indication indicates the changed support of the combination of capabilities. The wireless communication device may accomplish this while maintaining a wireless connection to the wireless communication network. Accordingly, changes in the support of combinations may be considered in a dynamic manner, without interrupting connectivity of the wireless communication device to the wireless communication network.

According to an embodiment of the invention, the wireless communication device determines depending on current operational conditions of the wireless communication device whether the combination of capabilities is supported by the wireless communication device. In this way, the operational conditions of the wireless communication device may be taken into account in a dynamic manner.

According to a further embodiment, a method is provided. According to the method a base station of the wireless communication network receiving a first indication from a wireless communication device. The first indication indicates a set of at least two capabilities of the wireless communication device. Further, the base station receives a second indication from the wireless communication device. The second indication indicates whether a combination of at least two of the capabilities is supported. Depending on the first indication and the second indication, the base station controls at least one wireless transmission of the radio device. In this way, it can be efficiently taken into account that under certain conditions simultaneous support of certain capabilities may be difficult or impossible to implement, even if each capability alone is supported, and the base station may utilize features based on the supported combination(s) when controlling wireless transmissions of the wireless communication device.

According to an embodiment, the base station receives a third indication from the wireless communication device. The third indication indicates that support of the combination of capabilities by the wireless communication device has changed. This may be accomplished while maintaining a wireless connection to the wireless communication device. Accordingly, when controlling wireless transmissions of the wireless communication device, the base station may consider changes in the support of combinations in a dynamic manner, without interrupting connectivity of the wireless communication device to the wireless communication network.

According to a further embodiment, a wireless communication device is provided. The wireless communication device comprises a wireless interface for connecting to a wireless communication network. Further, the wireless communication device comprises one or more processors configured to:

provide a first indication to the wireless communication network, the first indication indicating a set of at least two capabilities of the wireless communication device;
determine whether the wireless communication device supports a combination of two or more of the capabilities; and
provide a second indication to the wireless communication network, the second indication indicating whether the combination of capabilities is supported by the wireless communication device.

The at least one processor of the wireless communication device may be configured to perform the steps as performed by wireless communication device in the above-mentioned method.

In particular, the at least one processor of the wireless communication device may be configured to, while maintaining a wireless connection to the wireless communication network, determine that support of the combination of capabilities by the wireless communication device has changed and send a third indication to the wireless communication network, the third indication indicating the changed support of the combination of capabilities.

In addition or as an alternative, the at least one processor of the wireless communication device may be configured to determine depending on current operational conditions of the wireless communication device whether the combination of capabilities is supported by the wireless communication device.

According to a further embodiment, a base station for a wireless communication network is provided. The base station comprises a wireless interface to a wireless communication device. Further, the base station comprises one or more processors configured to:

receive, from a wireless communication device, a first indication indicating a set of at least two capabilities of the wireless communication device;
receive a second indication from the wireless communication device, the second indication indicating whether a combination of two or more of the capabilities is supported by the wireless communication device; and
depending on the first indication and the second indication, control at least one wireless transmission of the wireless communication device.

The at least one processor of the base station may be configured to perform the steps as performed by the base station in the above-mentioned method.

In particular, the at least one processor of the base station may be configured to, while maintaining a wireless connection to the wireless communication device, receive a third indication from the wireless communication device, the third indication indicating that support of the combination of capabilities by the wireless communication device has changed.

According to a further embodiment, a system is provided. The system comprises a wireless communication device and a base station. The wireless communication device is configured to provide a first indication to the base station. The first indication indicates a set of at least two capabilities of the wireless communication device. Further, the wireless communication device is configured to determine whether it supports a combination of two or more of the capabilities and to provide a second indication to the base station. The second indication indicating whether the combination of capabilities is supported by the wireless communication device. The base station is configured to receive the first indication and the second indication and, depending on the first indication and the second indication, control at least one wireless transmission of the wireless communication device. The wireless communication device may be configured to operate as described in the above embodiments.

In the above embodiments of methods, a wireless communication device, a base station, and a system, the second indication may comprise at least one indicator which indicates, for a at least one preconfigured combination of the capabilities, whether the preconfigured combination is supported. By means of the indicator and the preconfiguration of combinations, the support of combinations can be signalled with low overhead. Such preconfigured combination(s) may be stored as part of factory settings and/or operator defined settings of the wireless communication device.

Further, the second indication may comprise an indication of at least one limitation with respect to a preconfigured set of combinations of capabilities. In particular, the second indication may comprise an indication of a first limitation which limits the preconfigured set of capabilities to a first subset of combinations and a second limitation which further limits the first subset of combinations to a second subset of combinations. Accordingly, a hierarchical organization the supported combinations may be assumed and efficiently signal by indicating the limitations from the preconfigured set. The preconfigured set may be based on factory settings of the wireless communication device and/or on operator defined settings of the wireless communication device.

Further, the first indication and the second indication may be transmitted in different messages from the wireless communication device to the wireless communication network, in particular to the above-mentioned base station.

Further, the second indication may be transmitted by physical layer control signalling and/or medium access control layer control signalling.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to efficiently handling support of multiple capabilities of a wireless communication device, in the following referred to as UE, in a wireless communication network. The wireless communication network may be a cellular network based on the LTE wireless access technology. However, other wireless communication technologies could be utilized as well. Accordingly, in the following description "wireless communication" may correspond to radio communication, but is not limited thereto. This may be achieved by using a first indication, by means of which the UE can indicate a set of multiple supported capabilities, and a second indication, by means of which the UE can indicate whether a one or more combinations of two or more capabilities from the set are supported or not. In this way, it becomes possible to efficiently address scenarios where the possibility utilizing one capability depends on the utilization of one or more other capabilities. These two indications can be sent in one or in multiple messages.

Figure 1:
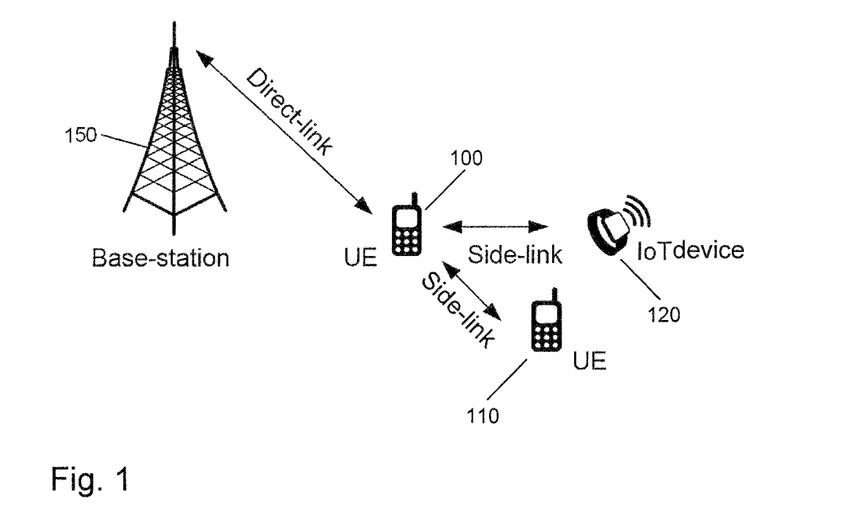
FIG. 1 schematically illustrates a wireless communication network system according to an embodiment of the invention.

FIG. 1 schematically illustrates an exemplary scenario in which the concepts may be utilized. The scenario of FIG. 1 involves a UE 100, a further UE 110, an IoT device 120, and a base station 150. Wireless communication between the UE 100, the further UE 110, the IoT device 120, and the base station 150 may be based on the LTE radio access technology. However, it is to be understood that other radio access technologies or wireless communication technologies could be utilized as well, e.g., a 5G (5th Generation) radio access technology or NR (New Radio) technology. In the example of FIG. 1, it is assumed that the UE 100 may be utilized as a relay station for establishing a link between the base station 150 and the further UE 110 and/or a link between the base station 150 and the IoT device. In the following, a link between the base station 150 and the UE 100 is also referred to as "direct-link" and a link between the UE 100 and the further UE 110 or the IoT device 120 is referred to as "side-link". Some capabilities of the UE 100 may relate to the direct-link, while other capabilities of the UE 100 may relate to the side side-link(s). Since the direct-link and the side-link(s) of the UE 100 typically utilize the same radio circuitry, there may be limitations with respect to the simultaneous utilization of the side-link(s) and the direct-link. Specifically, that the capabilities relating to the direct-link may depend on whether one or more side-links are activated (or on the capabilities utilized for such side-links). In the following, examples will be described in more detail, according to which such different capabilities and their supported combinations may be efficiently indicated from the UE 100 to the base station 150.

Figure 2:
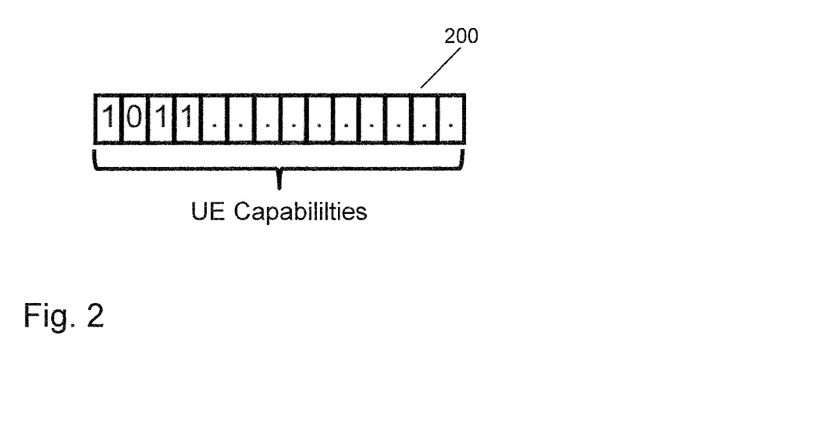
FIG. 2 schematically illustrates a bitmap as used according to an embodiment of the invention for indicating a set of capabilities of a UE.

FIG. 2 shows an example of a bitmap 200 which may be used by the UE 100 to indicate its capabilities to the wireless communication network. For indicating its capabilities to the wireless communication network, the UE 100 may send the bitmap 200 to the base station 150. This may be accomplished upon initial registration of the UE 100 with the wireless communication network. However, in some scenarios the bitmap 200 could also be transmitted at a later point of time. For example, the UE 100 could transmit the bitmap while maintaining a connection to the wireless communication network, e.g., for indicating an update of its capabilities. As illustrated, the bitmap 200 includes a plurality of bits from which subsets of one or more bits indicate whether or not, and optionally also in which way, a certain capability is supported by the UE 100. For example, a single bit of "1" could indicate that the capability is supported. A subset of multiple bits could indicate one of multiple options of supporting a certain capability, a level of support (e.g., distinguishing between no, basic, and full support), and/or one or more parameters related to the capability (e.g., a maximum supported bitrate when using the capability). The mapping of capabilities to bit positions in the bitmap 200 may be preconfigured in the UE 100 and the base station 150. Such preconfiguration may be based on a telecommunication standard and may be based on factory settings or on operator defined settings. Accordingly, the support of a certain capability may be indicated in a binary manner (e.g., by a single bit indicating either "supported" or "unsupported"), but also be indicated by multiple bits, e.g., to indicate a level of support, a selected option, or one or more parameters related to the capability.

Figure 3:
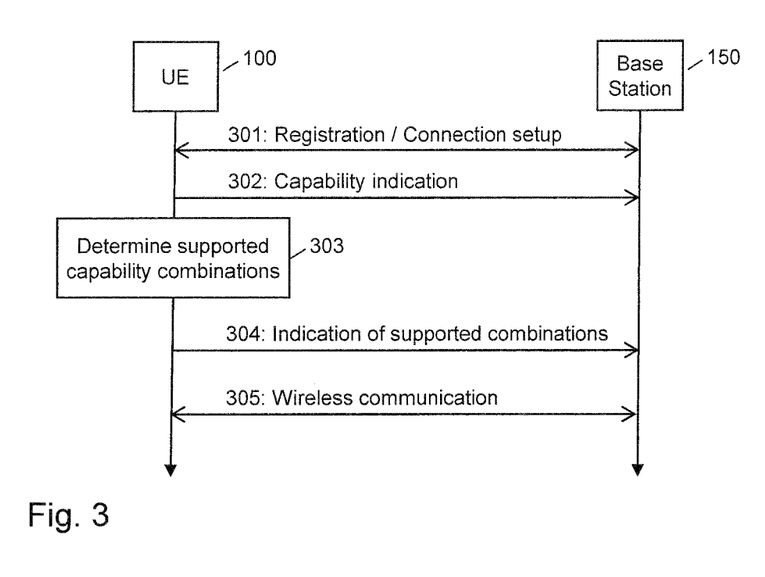
FIG. 3 illustrates an example of processes according to an embodiment of the invention.

FIG. 3 illustrates an example of processes which may be implemented by the UE 100 and the base station 150 for indicating capabilities of the UE 100 and supported combinations of these capabilities.

As illustrated by 301, the UE 100 may first perform registration with the wireless communication network and/or setup of a connection with the wireless communication network. In the course of this process or in response to this process, the UE 100 may send an indication of its capabilities to the base station 150, as illustrated by message 302. For example, message 302 could include a bitmap as explained in connection with FIG. 2. In the illustrated example, it is assumed that the UE 100 indicates multiple capabilities, i.e., a set of capabilities. By way of example, these capabilities could include the support of the above-mentioned relaying via one or more side-links, the support of dual connectivity, i.e., simultaneous utilization of connections to different base stations of the wireless communication network, or the support of carrier aggregation, i.e., simultaneous utilization of multiple carriers for establishing a connection to the wireless communication network.

As illustrated by block 303, the UE 100 may then determine which combinations of the capabilities indicated by message 302 are supported by the UE 100. This determination may depend upon current operational conditions of the UE 100. For example, if the UE 100 is currently configured to operate as a relay station, e.g., for the further UE 110 or the IoT device 120 as illustrated in FIG. 1, this may limit the utilization of dual connectivity or carrier aggregation.

The UE 100 then indicates the result of the determination to the base station 150, as illustrated by message 304. Specifically, the message 304 indicates which combinations of the capabilities indicated by message 302 are currently supported by the UE 100. Here, combinations of two of these capabilities may be considered. However, it is also possible to consider combinations of three or more capabilities. The supported combinations may be indicated by a further bitmap. For example, a set of possible combinations could be preconfigured, and a subset of one or more bits from the further bitmap could indicate whether or not, and optionally also in which way, a certain combination of capabilities is supported by the UE 100. For example, a single bit of "1" could indicate that the combination is supported. A subset of multiple bits could indicate one of multiple options of supporting a certain combination, a level of support (e.g., distinguishing between no, basic, and full support), and/or one or more parameters related to the supported combination (e.g., a maximum supported bitrate when using the combination). The mapping of combinations to bit positions in the bitmap may be preconfigured in the UE 100 and the base station 150. Such preconfiguration may be based on a telecommunication standard and may be based on factory settings or on operator defined settings. By using a bitmap for indicating the supported combinations, low layer signalling may be used for indicating the supported combinations. For example, the supported combinations could be indicated by physical layer control signalling and/or by MAC (Medium Access Control) layer signalling. However, it is noted that also more flexible schemes of indicating the supported combinations could be utilized, e.g., in the form of a table explicitly identifying two or more of the capabilities and how they can be combined, e.g., in an RRC message. Accordingly, the support of a certain combination of capabilities may be indicated in a binary manner (e.g., by a single bit indicating either "supported" or "unsupported"), but also be indicated by multiple bits, e.g., to indicate a level of support, a selected option, or one or more parameters related to the combination of capabilities.

The base station 150 may then control wireless communication of the UE 100 based on the supported capabilities indicated by message 302 and the supported combinations indicated by message 304. As illustrated by 305, this may involve controlling wireless communication between the UE 100 and the base station 150. However, this may also involve controlling other wireless communication, such as side-link transmissions to from the UE 100.

In the example of FIG. 3, the capabilities of the UE 100 and the supported combinations are indicated in separate messages. This may be particularly beneficial in scenarios where the capabilities of the UE 100 static, e.g., determined by hardware features of the UE 100, but the possible combinations of capabilities vary in a dynamic fashion depending on how the different capabilities are actually utilized. However, in some scenarios it is also possible to indicate the capabilities of the UE 100 and the supported combinations in the same message. A corresponding example is illustrated in FIG. 4.

Figure 4:
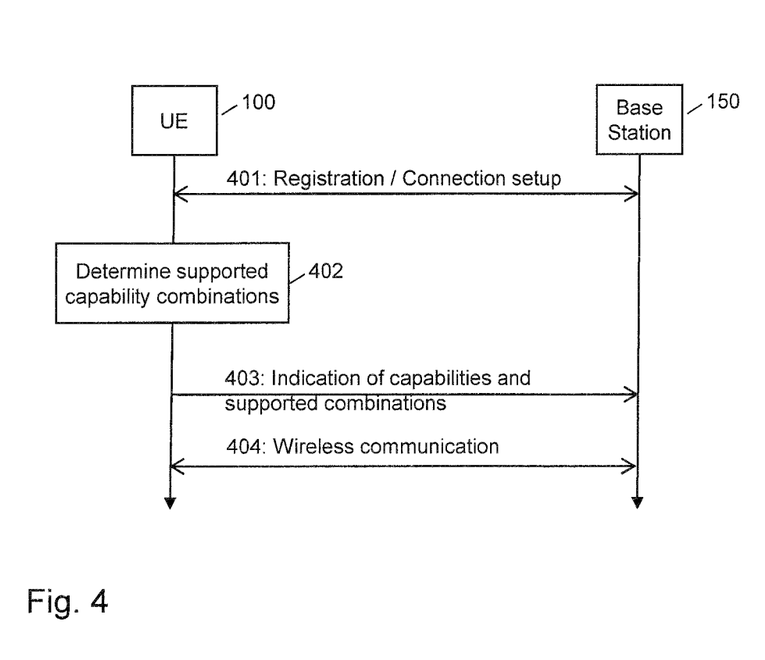
FIG. 4 illustrates a further example of processes according to an embodiment of the invention.

Also in the example of FIG. 4, the UE 100 may first perform registration with the wireless communication network and/or setup of a connection with the wireless communication network, as illustrated by 401.

The UE 100 is assumed to have multiple capabilities, i.e., a set of capabilities. These capabilities could include the support of the above-mentioned relaying via one or more side-links, the support of dual connectivity, or the support of carrier aggregation. As illustrated by block 402, the UE 100 may then determine which combinations of its capabilities are supported by the UE 100. This determination may depend upon current operational conditions of the UE 100. For example, if the UE 100 is currently configured to operate as a relay station, e.g., for the further UE 110 or the IoT device 120 as illustrated in FIG. 1, this may limit the utilization of dual connectivity or carrier aggregation.

The UE 100 may send then send an indication of its capabilities and an indication of the supported combinations of these capabilities to the base station 150, as illustrated by message 403. For example, message 403 could include a bitmap as explained in connection with FIG. 2. Further, message 403 indicates the result of the determination of block 402 to the base station 150. That is to say, the message 403 also indicates which combinations of the capabilities indicated by the message 403 are supported by the UE 100. Here, combinations of two of these capabilities may be considered. However, it is also possible to consider combinations of three or more capabilities. The supported combinations may be indicated by a further bitmap or in an extension of the bitmap used for indicating the supported capabilities. An example of an extended bitmap 500 which may be used in the case of the latter option is illustrated in FIG. 5.

Figure 5:
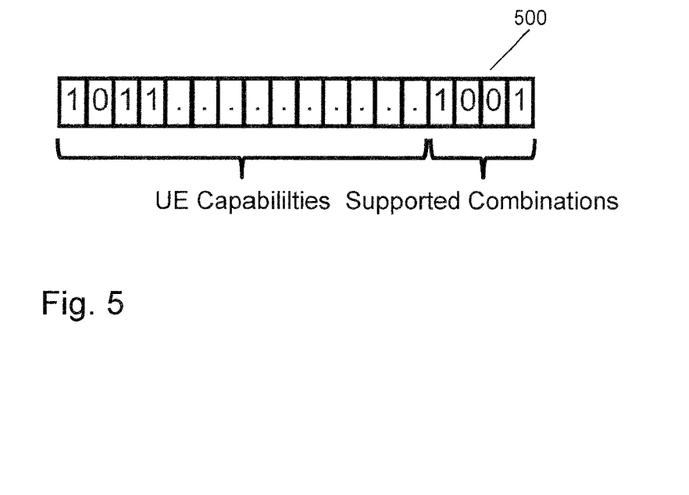
FIG. 5 schematically illustrates a bitmap as used according to an embodiment of the invention for indicating a set of capabilities of a UE and supported combinations of capabilities from this set.

As illustrated in FIG. 5, the bitmap 500 includes a plurality of bits from which subsets of one or more bits indicate whether or not, and optionally also in which way, a certain capability is supported by the UE 100. For example, a single bit of "1" could indicate that the capability is supported. A subset of multiple bits could indicate one of multiple options of supporting a certain capability, a level of support (e.g., distinguishing between no, basic, and full support), and/or one or more parameters related to the capability (e.g., a maximum supported bitrate when using the capability). The mapping of capabilities to bit positions in the bitmap 500 may be preconfigured in the UE 100 and the base station 150. Such preconfiguration may be based on a telecommunication standard and may be based on factory settings or on operator defined settings. Further, the bitmap 500 includes one or more bits which each indicate whether a certain combination of capabilities is supported or not. The mapping of combinations to bit positions in the bitmap 500 may be preconfigured in the UE 100 and the base station 150. Such preconfiguration may be based on a telecommunication standard and may be based on factory settings or on operator defined settings. Utilization of a single bitmap for indicating both supported capabilities and supported combinations of these capabilities may allow for achieving a low signalling overhead. This may in turn be beneficial if frequent dynamic signalling of changes of both the supported capabilities and the supported combinations is needed. However, it is noted that also more flexible schemes of indicating the capabilities and the supported combinations in the same message could be utilized, e.g., in the form of a table explicitly identifying the capabilities and how they can be combined.

The base station 150 may then control wireless communication of the UE 100 based on the supported capabilities and the supported combinations indicated by message 403. As illustrated by 404, this may involve controlling wireless communication between the UE 100 and the base station 150. However, this may also involve controlling other wireless communication, side-link transmissions to from the UE 100.

As mentioned above, the supported combinations may depend in a dynamic manner on the current operational conditions of the UE 100. Accordingly, the UE 100 may repeatedly re-determine which combinations of capabilities are supported and provide corresponding indications of supported combinations to the wireless communication network. An example of corresponding processes is illustrated in FIG. 6.

Figure 6:
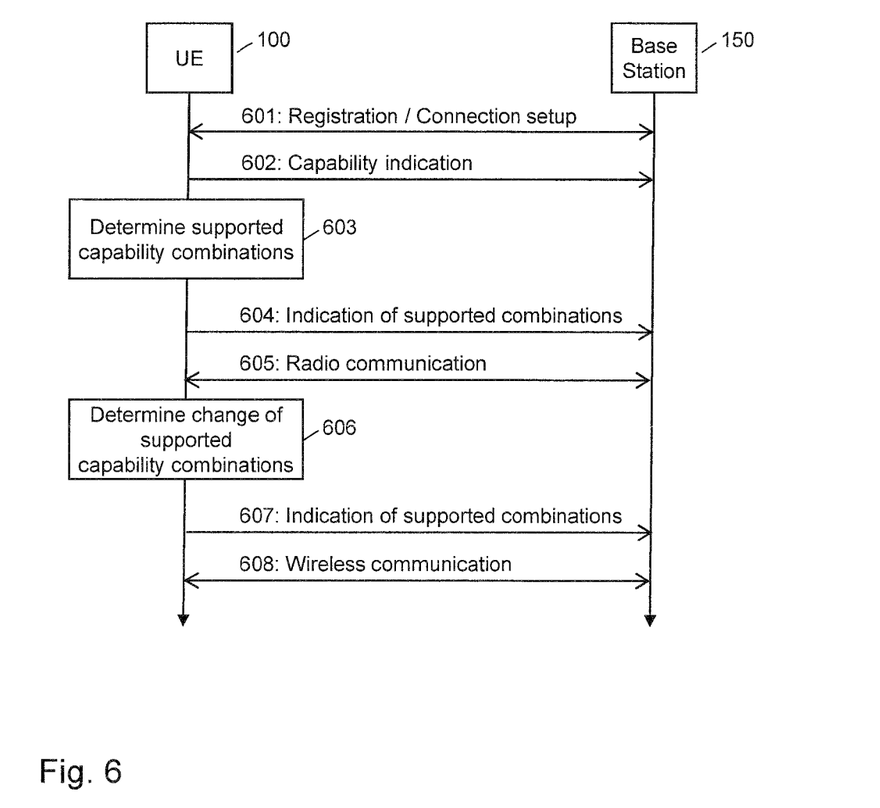
FIG. 6 illustrates a further example of processes according to an embodiment of the invention.

In the example of FIG. 6, the UE 100 may first perform registration with the wireless communication network and/or setup of a connection with the wireless communication network. In the course of this process or in response to this process, the UE 100 may send an indication of its capabilities to the base station 150, as illustrated by message 602. For example, message 602 could include a bitmap as explained in connection with FIG. 2. In the illustrated example, it is assumed that the UE 100 indicates multiple capabilities, i.e., a set of capabilities. By way of example, these capabilities could include the support of the above-mentioned relaying via one or more side-links, the support of dual connectivity or the support of carrier aggregation.

As illustrated by block 603, the UE 100 may then determine which combinations of the capabilities indicated by message 602 are currently supported by the UE 100. This determination depends upon the current operational conditions of the UE 100. For example, if the UE 100 is currently configured to operate as a relay station, e.g., for the further UE 110 or the IoT device 120 as illustrated in FIG. 1, this may limit the utilization of dual connectivity or carrier aggregation.

The UE 100 then indicates the result of the determination of block 603 to the base station 150, as illustrated by message 604. Specifically, the message 604 indicates which combinations of the capabilities indicated by message 602 are currently supported by the UE 100. The message 604 may be similar to the message 304, and details concerning how the supported combinations may be indicated in the message 604 can thus be taken from the above description in connection with the message 304.

The base station 150 may then control wireless communication of the UE 100 based on the supported capabilities indicated by message 602 and the supported combinations indicated by message 604. As illustrated by 605, this may involve controlling wireless communication between the UE 100 and the base station 150. However, this may also involve controlling other wireless communication, side-link transmissions to from the UE 100.

At some point, the UE 100 may then determine that the supported combinations of capabilities have changed, as indicated by block 606. Similar to the determination of block 603, the determination of block 606 is based on considering the current operational conditions of the UE 100. The change in the supported combinations may for example be due to the UE 100 starting to actively utilize a certain capability or due to the UE 100 stopping active utilization of a certain capability.

The UE 100 then indicates the result of the determination of block 606 to the base station 150, as illustrated by message 607. Specifically, the message 607 indicates which combinations of the capabilities indicated by message 602 are now supported by the UE 100. The message 607 may be similar to the message 304, and details concerning how the supported combinations may be indicated in the message 607 can thus be taken from the above description in connection with the message 304.

The base station 150 may then control wireless communication of the UE 100 based on the supported capabilities indicated by message 602 and the supported combinations indicated by message 607. As illustrated by 608, this may involve controlling wireless communication between the UE 100 and the base station 150. However, this may also involve controlling other wireless communication, such as side-link transmissions to from the UE 100.

In some scenarios, the supported combinations may also be indicated in terms of limitations with respect to a preconfigured set of combinations. The limitations may be introduced in a hierarchical manner, i.e., one limitation may define a subset of combinations, and one or more further limitations may be used for further limiting this subset. The possible limitations may be preconfigured as well. For example, such preconfiguration may be based on a telecommunication standard and may be based on factory settings or on operator defined settings. By starting from the preconfigured set of combinations and defining possible limitations, typical dependencies of capabilities on each other may be represented in a highly efficient manner in terms of a position on a downgrade path from the maximum possible set of combinations. An example of how the set of combinations and possible limitations may be organized is shown in FIG. 7.

Figure 7:
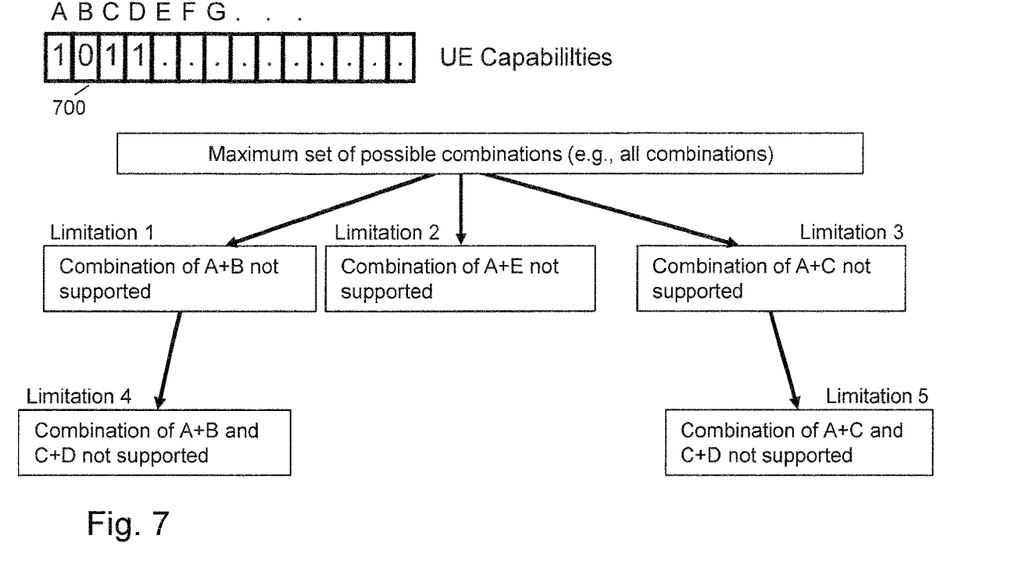
FIG. 7 schematically illustrates limitations of a set of combinations of capabilities as used according to an embodiment of the invention.

As shown in FIG. 7, a bitmap 700 may be used for indicating a set of multiple capabilities (in this example designated by A, B, C, D, F, G, . . . ) which are supported by the UE 100. Further, a maximum set of combinations of these capabilities is defined. For example, this maximum set of combinations may include all possible combinations. The maximum set of combinations may correspond to a legacy setting of the supported combinations, for which no explicit indication from the UE 100 is required. Starting from the maximum set of combinations, limitations are defined. Each limitation excludes one or more combinations from the maximum possible set of combinations and thus defines a corresponding subset of the possible combinations. In the example of FIG. 7, a first limitation (limitation 1) defines that the combination of capability A and capability B is not supported. A second limitation (limitation 2) defines that the combination of capability A and capability E is not supported. A third limitation (limitation 3) defines that the combination of capability A and capability C is not supported. The first, second and third limitation are limitations of a first hierarchy level which may be applied alternatively. Further, a fourth limitation may be applied in addition to the first limitation to define that also the combination of capability C and capability D is not supported (thereby effectively defining that the combination of capability A and capability B and the combination of capability C and capability D are not supported). Further, a fifth limitation may be applied in addition to the third limitation to define also the combination of capability C and capability D is not supported (thereby effectively defining that the combination of capability A and capability C and the combination of capability C and capability D are not supported). The fourth and fifth limitation are limitations of a second hierarchy level which may be applied in addition to the corresponding limitation of the first hierarchy level.

The limitations with respect to the maximum set of possible combinations may be utilized for efficiently indicating dynamic changes of the supported combinations. In particular, even in the case of a large set of supported capabilities and those a high number of possible combinations, the actually supported combinations may be indicated efficiently by only identifying the limitation(s) to be applied on the maximum possible set. For example, the limitations could be identified in terms of an index. An example of corresponding processes is illustrated in FIG. 8.

Figure 8:
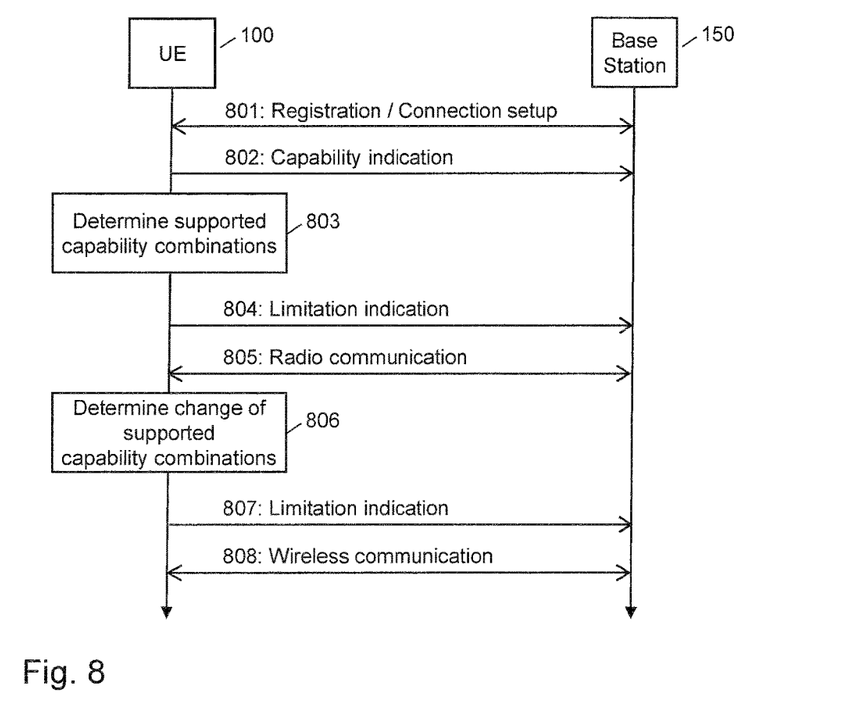
FIG. 8 illustrates a further example of processes according to an embodiment of the invention in which supported combinations of capabilities are indicated based on the limitations of FIG. 7.

In the example of FIG. 8, the UE 100 may first perform registration with the wireless communication network and/or setup of a connection with the wireless communication network. In the course of this process or in response to this process, the UE 100 may send an indication of its capabilities to the base station 150, as illustrated by message 802. For example, message 802 could include a bitmap as explained in connection with FIG. 7. In the illustrated example, it is assumed that the UE 100 indicates at least support of the capabilities A, B, C, and D.

As illustrated by block 803, the UE 100 may then determine which combinations of the capabilities indicated by message 802 are currently supported by the UE 100. This determination depends upon the current operational conditions of the UE 100 and corresponds to identifying which limitation(s) to apply on the maximum set of possible combinations (e.g., limitation 3).

The UE 100 then indicates the result of the determination of block 803 to the base station 150, as illustrated by message 804. Specifically, the message 804 indicates which limitation is to be applied on the maximum set of possible combinations. The message 804 may also indicate multiple limitations to be applied. In the illustrated example, it is assumed that the message 804 indicates that limitation 3 is to be applied on the maximum set of possible combinations.

The base station 150 may then control wireless communication of the UE 100 based on the supported capabilities indicated by message 802 and the supported combinations indicated by message 804. As illustrated by 805, this may involve controlling wireless communication between the UE 100 and the base station 150. However, this may also involve controlling other wireless communication, such as side-link transmissions to from the UE 100.

At some point, the UE 100 may then determine that the supported combinations of capabilities have changed, as indicated by block 806. Similar to the determination of block 803, the determination of block 806 is based on considering the current operational conditions of the UE 100. The change in the supported combinations may for example be due to the UE 100 starting to actively utilize a certain capability or due to the UE 100 stopping active utilization of a certain capability. The determination of step 806 corresponds to identifying which limitation(s) now to apply on the maximum set of possible combinations. This may involve identifying one or more additional limitations to be applied identifying one or more limitations no longer to be applied. In the example of FIG. 8, it is assumed that the UE 10 identifies that now limitation 5 is to be applied in addition to limitation 5.

The UE 100 then indicates the result of the determination of block 806 to the base station 150, as illustrated by message 807. Specifically, the message 807 indicates the limitation(s) now to be applied on the maximum set of possible combinations (in the illustrated example limitation 3 and limitation 5).

The base station 150 may then control wireless communication of the UE 100 based on the supported capabilities indicated by message 802 and the supported combinations indicated by message 807. As illustrated by 808, this may involve controlling wireless communication between the UE 100 and the base station 150. However, this may also involve controlling other wireless communication, such as side-link transmissions to from the UE 100.

Figure 9:
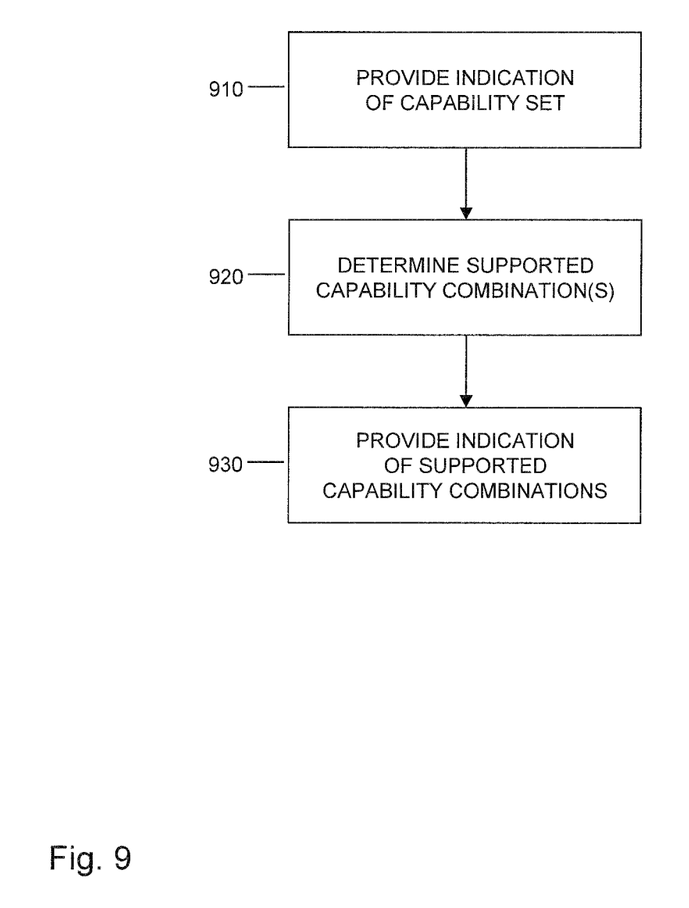
FIG. 9 shows a flowchart for illustrating a method according to an embodiment of the invention, which may be implemented by a wireless communication device.

FIG. 9 shows a flowchart illustrating a method which may be used for controlling wireless transmissions in a wireless communication network, e.g., a cellular network. By the method of FIG. 9 a wireless communication device, e.g., the above-mentioned UE 100, may implement concepts as described above. If a processor based implementation of the wireless communication device is utilized, at least a part of the steps of the method may be performed and/or controlled by one or more processors of the wireless communication device.

At step 910, the wireless communication device provides a first indication to the wireless communication network. The first indication indicates a set of at least two capabilities of the wireless communication device. The capabilities may be selected from a group of standardized capabilities, such as UE capabilities specified by 3GPP. By way of example, the first indication may be sent in terms of a bitmap which includes at least one bit for each possible capability, as for example shown in FIG. 2, 5, or 7.

At step 920, the wireless communication device determines whether the wireless communication device supports a combination of two or more of the capabilities. In some cases, utilization of one capability may block certain hardware resources of the wireless communication device, so that they cannot be used for another capability, which means that these two capabilities cannot be actively utilized at the same time. In other cases, simultaneous utilization of two or more capabilities may be possible. This may also depend on how these capabilities are utilized. Accordingly, the determination of step 920 may depend on current operational conditions of the wireless communication device.

At step 930, the wireless communication device provides a second indication to the wireless communication network. The second indication indicates whether the combination of capabilities is supported by the wireless communication device. In other words, the second indication may indicate the result of the determination of step 920. Based on one or more of the indicated capabilities and/or indicated supported combination of capabilities, the wireless communication device may then perform at least one wireless transmission. This may be accomplished under control of the wireless communication network.

The second indication may include at least one indicator which indicates, for a preconfigured combination of the capabilities, whether the preconfigured combination is supported. For example, the indicator could be a flag in a bitmap for indicating support of multiple possible combinations. In some cases, this bitmap could also be an extension of a bitmap as used in step 910 for indicating the capabilities of the wireless communication device. A corresponding example of an extended map is illustrated in FIG. 5. In addition or as an alternative to the flag, the second indication may also include a subset of bits which indicates a level of support of the preconfigured combination of capabilities, a selected option of supporting the preconfigured combination of capabilities, and/or one or more parameters related to the supported preconfigured combination of capabilities.

In some scenarios, the second indication may also include an indication of at least one limitation with respect to a preconfigured set of combinations of capabilities. If multiple limitations are indicated, these limitations may be organized in a hierarchical manner. For example, the second indication may include an indication of a first limitation, which limits the preconfigured set of capabilities to a first subset of combinations, and a second limitation, which further limits the first subset of combinations to a second subset of combinations. A corresponding example showing utilization of limitations for indicating supported combinations is illustrated in FIGS. 7 and 8. The possible combinations and limitations may be standardized or otherwise preconfigured in the wireless communication device.

The first indication and the second indication may be transmitted in different messages from the wireless communication device to the wireless communication network, e.g., as illustrated in FIGS. 3, 6, and 8. However, sending the first indication and the second indication in the same message is possible as well, e.g., as illustrated in FIG. 4. In some scenarios, the second indication may be transmitted by physical layer control signalling and/or medium access control layer control signalling. However, other ways of indicating the support of the combination could be utilized as well, e.g., RRC signalling.

In some scenarios, the wireless communication device may also determine that there has been a change of support of the combination of capabilities by the wireless communication device as indicated by the second indication. In this case, the wireless communication device may send a third indication to the wireless communication network. The third indication indicates the changed support of the combination of capabilities. This may be accomplished while maintaining a wireless connection to the wireless communication network. Examples of corresponding processes are illustrated in FIGS. 6 and 8. The determination of the change of support of the combination of capabilities may be performed in a similar manner as the determination of supported combinations, e.g., based on the current operational conditions of the wireless communication device. The changed support of the combination may be indicated in the same way as described above for the support of combinations.

Figure 10:
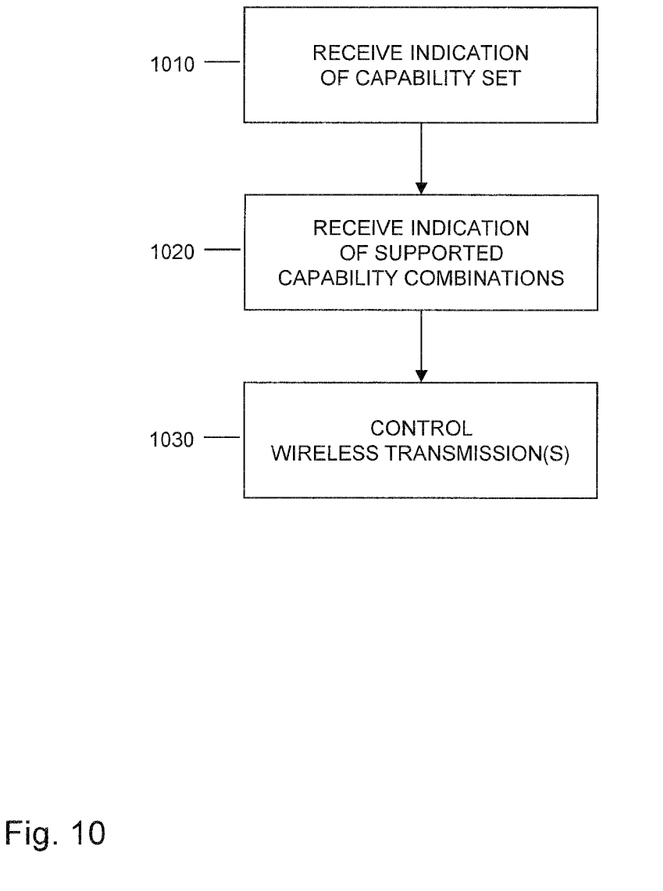
FIG. 10 shows a flowchart for illustrating a further method according to an embodiment of the invention, which may be implemented by a base station.

FIG. 10 shows a flowchart illustrating a method which may be used for controlling wireless transmissions in a wireless communication network, e.g., a cellular network. By the method of FIG. 10, a base station of the wireless communication network, e.g., the above-mentioned base station 150, may implement concepts as described above. If a processor based implementation of the base station is utilized, at least a part of the steps of the method may be performed and/or controlled by one or more processors of the base station.

At step 1010, the base station receives a first indication from a wireless communication device, e.g., from the above-mentioned UE 100. The first indication indicates a set of at least two capabilities of the wireless communication device. The capabilities may be selected from a group of standardized capabilities, such as UE capabilities specified by 3GPP. By way of example, the first indication may be received in terms of a bitmap which includes at least one bit for each possible capability, as for example shown in FIG. 2, 5, or 7.

At step 1020, the base station receives a second indication from the wireless communication device. The second indication indicates whether a combination of at least two of the capabilities indicated in step 1010 is supported by the wireless communication device. In other words, the second indication may indicate the result of a determination as described in connection with step 920.

The second indication may include at least one indicator which indicates, for a preconfigured combination of the capabilities, whether the preconfigured combination is supported. For example such indicator could be a flag and could be part of a bitmap for indicating support of multiple possible combinations. In some cases, this bitmap could also be an extension of a bitmap as used in step 1010 for indicating the capabilities of the wireless communication device. A corresponding example of an extended map is illustrated in FIG. 5. In addition or as an alternative to the flag, the second indication may also include a subset of bits which indicates a level of support of the preconfigured combination of capabilities, a selected option of supporting the preconfigured combination of capabilities, and/or one or more parameters related to the supported preconfigured combination of capabilities.

In some scenarios, the second indication may also include an indication of at least one limitation with respect to a preconfigured set of combinations of capabilities. If multiple limitations are indicated, these limitations may be organized in a hierarchical manner. For example, the second indication may include an indication of a first limitation, which limits the preconfigured set of capabilities to a first subset of combinations, and a second limitation, which further limits the first subset of combinations to a second subset of combinations. A corresponding example showing utilization of limitations for indicating supported combinations is illustrated in FIGS. 7 and 8. The possible combinations and limitations may be standardized or otherwise preconfigured in the wireless communication device.

The first indication and the second indication may be transmitted in different messages from the wireless communication device to the base station, e.g., as illustrated in FIGS. 3, 6, and 8. However, sending the first indication and the second indication in the same message is possible as well, e.g., as illustrated in FIG. 4. In some scenarios, the second indication may be transmitted by physical layer control signalling and/or medium access control layer control signalling. However, other ways of indicating the support of the combination could be utilized as well, e.g., RRC signalling.

In some scenarios, the base station may also receive a third from the wireless communication device. The third indication indicates that there has been a change of support of the combination of capabilities. This may be accomplished while maintaining a wireless connection to the wireless communication network. Examples of corresponding processes are illustrated in FIGS. 6 and 8. The changed support of the combination may be indicated in the same way as described above for the support of combinations.

At step 1030, the base station controls at least one wireless transmission of the wireless communication device. This is accomplished depending on the first indication received at step 1010 and the second indication received at step 1020. For example, this may involve activating or deactivating certain wireless functionalities of the wireless communication device which make use of the indicated capabilities.

It is to be understood that the methods of FIGS. 9 and 10 may also be combined, e.g., in a system including at least one wireless communication device operating according to the method of FIG. 9 and at least one base station operating according to the method of FIG. 10.

Figure 11:
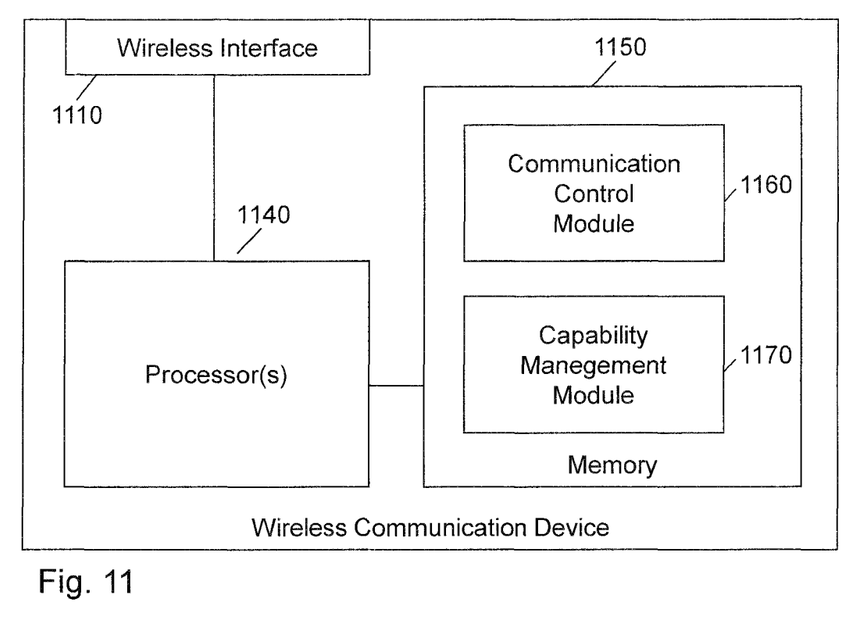
FIG. 11 schematically illustrates a processor-based implementation of a wireless communication device according to an embodiment of the invention.

FIG. 11 shows a block diagram for schematically illustrating a processor based implementation of a wireless communication device which may be utilized for implementing the above concepts. The wireless communication device may for example correspond to a UE, such as the above-mentioned UE 100.

As illustrated, the wireless communication device includes a wireless interface 1110, e.g., a radio interface. The wireless communication device may utilize the wireless interface 1110 for connecting to a wireless communication network, e.g., through a base station of the wireless communication network, such as the base station 150.

Further, the wireless communication device is provided with one or more processors 1140 and a memory 1150. The wireless interface 1110, and the memory 1150 are coupled to the processor(s) 1140, e.g., using one or more internal bus systems of the wireless communication device.

The memory 1150 includes program code modules 1160, 1170 with program code to be executed by the processor(s) 1140. In the illustrated example, these program code modules include a communication control module 1160 and a capability management module 1170.

The communication control module 1160 may implement functionalities of controlling wireless transmissions based on one or more capabilities of the wireless communication device. The capability management module 1170 may implement the above-described functionalities of indicating capabilities to the wireless communication network, determining one or more supported combinations of the capabilities, and indicating the supported combinations to the wireless communication network.

It is to be understood that the structures as illustrated in FIG. 11 are merely exemplary and that the wireless communication device may also include other elements which have not been illustrated, e.g., structures or program code modules for implementing known functionalities of a UE other type of wireless communication device.

Figure 12:
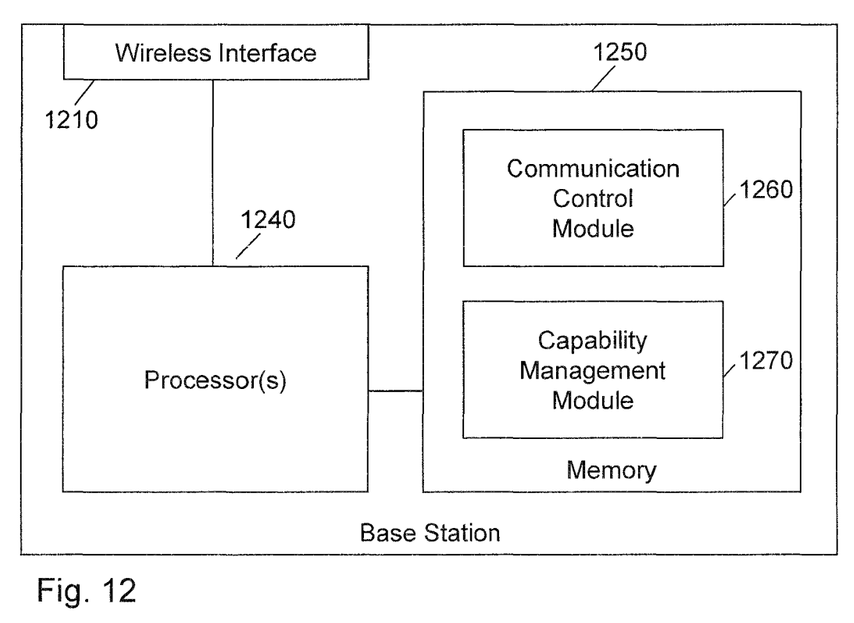
FIG. 12 schematically illustrates a processor-based implementation of a base station according to an embodiment of the invention.

FIG. 12 shows a block diagram for schematically illustrating a processor based implementation of a base station which may be utilized for implementing the above concepts. The base station may for example correspond to the above-mentioned base station 150.

As illustrated, the base station includes a wireless interface 1210, e.g., a radio interface. The base station may utilize the wireless interface 1210 for connecting to at least one wireless communication device, e.g., a UE such as the UE 100.

Further, the base station is provided with one or more processors 1240 and a memory 1250. The wireless interface 1210, and the memory 1250 are coupled to the processor(s) 1240, e.g., using one or more internal bus systems of the base station.

The memory 1250 includes program code modules 1260, 1270 with program code to be executed by the processor(s) 1240. In the illustrated example, these program code modules include a communication control module 1260 and a capability management module 1270.

The communication control module 1260 may implement functionalities of controlling wireless transmissions of a certain wireless communication device based on one or more capabilities of this wireless communication device. The capability management module 1270 may implement the above-described functionalities of receiving, from the wireless communication device, indications of its capabilities and of one or more supported combinations of these capabilities.

It is to be understood that the structures as illustrated in FIG. 12 are merely exemplary and that the base station may also include other elements which have not been illustrated, e.g., structures or program code modules for implementing known functionalities of a base station.

It is to be understood that the concepts as explained above are susceptible to various modifications. For example, the concepts could be applied in connection with various kinds of wireless communication technologies and devices. Further, the concepts may be applied in connection with various types of capabilities.

The invention claimed is:

1. A method, comprising:
a wireless communication device providing a first indication to a wireless communication network, the first indication indicating a set of at least two capabilities of the wireless communication device;
the wireless communication device determining based on current operational conditions whether the wireless communication device supports a combination of two or more of the capabilities from the set of at least two capabilities of the wireless communication device indicated with the first indication; and
the wireless communication device providing a second indication to the wireless communication network, the second indication indicating whether the combination of capabilities is supported by the wireless communication device.

2. The method according to claim 1, comprising:
while maintaining a wireless connection to the wireless communication network, the wireless communication device determining that support of the combination of capabilities by the wireless communication device has changed and sending a third indication to the wireless communication network, the third indication indicating the changed support of the combination of capabilities.

3. The method according to claim 1,
wherein the second indication comprises at least one indicator which indicates, for a preconfigured combination of the capabilities, whether the preconfigured combination is supported.

4. The method according to claim 1,
wherein the second indication comprises an indication of at least one limitation with respect to a preconfigured set of combinations of capabilities.

5. The method according to claim 4,
wherein the second indication comprises an indication of a first limitation which limits the preconfigured set of capabilities to a first subset of combinations and a second limitation which further limits the first subset of combinations to a second subset of combinations.

6. The method according to claim 1,
wherein the first indication and the second indication are transmitted in the same or in different messages from the wireless communication device to the base station wireless communication network.

7. The method according to claim 1,
wherein the second indication is transmitted by physical layer control signalling and/or medium access control layer control signal-ling.

8. A method, comprising:
a base station of a wireless communication network receiving, from a wireless communication device, a first indication indicating a set of at least two capabilities of the wireless communication device;
the base station receiving a second indication from the wireless communication device, the second indication indicating whether a combination of two or more of the capabilities from the set of at least two capabilities of the wireless communication device, indicated with the first indication, is supported by the wireless communication device based on current operational conditions of the wireless communication device; and
depending on the first indication and the second indication, the base station controlling at least one wireless transmission of the wireless communication device.

9. The method according to claim 8, comprising:
while maintaining a wireless connection to the wireless communication device, the base station receiving a third indication from the wireless communication device, the third indication indicating that support of the combination of capabilities by the wireless communication device has changed.

10. The method according to claim 8,
wherein the second indication comprises at least one indicator which indicates, for a preconfigured combination of the capabilities, whether the preconfigured combination is supported.

11. The method according to claim 8,
wherein the second indication comprises an indication of at least one limitation with respect to a preconfigured set of combinations of capabilities.

12. The method according to claim 11,
wherein the second indication comprises an indication of a first limitation which limits the preconfigured set of capabilities to a first subset of combinations and a second limitation which further limits the first subset of combinations to a second subset of combinations.

13. The method according to claim 8,
wherein the first indication and the second indication are transmit-ted in the same or in different messages from the wireless communication device to the base station.

14. The method according to claim 8,
wherein the second indication is transmitted by physical layer control signalling and/or medium access control layer control signalling.

15. A wireless communication device, comprising:
a wireless interface for connecting to a wireless communication network; and
one or more processors configured to:
provide a first indication to the wireless communication network, the first indication indicating a set of at least two capabilities of the wireless communication device;
determine, based on current operational conditions, whether the wireless communication device supports a combination of two or more of the capabilities from the set of at least two capabilities of the wireless communication device indicated with the first indication; and
provide a second indication to the wireless communication net-work, the second indication indicating whether the combination of capabilities is supported by the wireless communication device.

16. A base station for a wireless communication network, the base station comprising:
a wireless interface for connecting to a wireless communication device; and
one or more processors configured to:
receive, from a wireless communication device, a first indication indicating a set of at least two capabilities of the wireless communication device;
receive a second indication from the wireless communication device, the second indication indicating whether a combination of two or more of the capabilities from the set of at least two capabilities of the wireless communication device, indicated with the first indication, is supported by the wire-less communication device based on current operational conditions of the wireless communication device; and
depending on the first indication and the second indication, control at least one wireless transmission of the wireless communication device.

17. A system, comprising a wireless communication device and a base station;
wherein the wireless communication device is configured to:
provide a first indication to the base station, the first indication indicating a set of at least two capabilities of the wireless communication device;
determine, based on current operational conditions of the wireless communication device, whether the wireless communication device supports a combination of two or more of the capabilities from the set of at least two capabilities of the wireless communication device indicated with the first indication;
provide a second indication to the base station, the second indication indicating whether the combination of capabilities is supported by the wireless communication device; and
wherein the base station is configured to:
receive the first indication and the second indication; and
depending on the first indication and the second indication, control at least one wireless transmission of the wireless communication device.

* * * * *